E. F. Sherman,
Belt Fastener,
№ 80,227. Patented July 21, 1868.
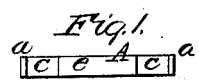
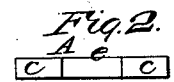
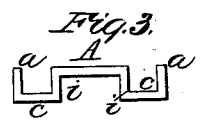
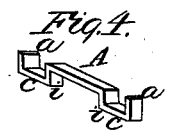
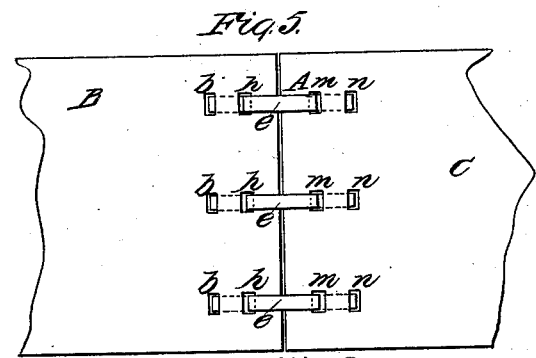
Witnesses:
Y. A. Antis
F. E. Rice
Inventor.
Edwin F. Sherman

United States Patent Office.

EDWIN F. SHERMAN, OF CHICOPEE, ASSIGNOR TO HIMSELF AND A. W. KELLOGG, OF PITTSFIELD, MASSACHUSETTS.

Letters Patent No. 80,227, dated July 21, 1868.

IMPROVED BELT-HOOK.

The Schedule referred to in these Letters Patent and making part of the same.

TO ALL WHOM IT MAY CONCERN:

Be it known that I, EDWIN F. SHERMAN, of Chicopee, in the county of Hampden, and State of Massachusetts, have invented a new and useful Improved Belt-Hook; and I do hereby declare that the following is a full, clear, and exact description thereof, reference being had to the accompanying drawings, making a part of this specification, and to the letters of reference marked thereon, in which—

Figure 1 is a plan view of one side of the hook.
Figure 2 is a plan view of the reverse side.
Figure 3 is a side elevation of the hook.
Figure 4 is a perspective view of the same.
Figure 5 is a plan view of a portion of a belt, showing the application of my invention in securing its two ends together.
Figure 6 is a plan view of the reverse side of the same.

The nature of my invention consists in the construction of a hook used to secure the ends of a belt to each other, whereby the strain or pulling-force of the hook may be exerted through a larger portion of the belt, or, in other words, that the hook may have an additional bearing at each end, over those now in common use.

As belt-hooks are now constructed, there is but one bearing or hook at each end of the device, and after a belt has been secured some little time by one of these common single hooks, there being but one hook or bearing at each end, the belt either stretches out at the place where the hole is made to insert the hook, or it tears away altogether, and the belt either has to be made shorter, a new piece put in, or a new belt made.

My invention in a great measure obviates these troubles, as I obtain a double bearing in the belt at each end of the hook, thereby causing the belt, at the place where it is punched or perforated for the purpose of inserting the hook, to last much longer without tearing away or stretching.

That others skilled in the art may be able to make and use my invention, I will proceed to describe its construction and application to use.

In the drawings—

A represents a piece of metal, which may be of any desired form in section, (I prefer that shown in the drawings,) and of the required hardness and stiffness, and which is bent into such form that it may have the central longitudinal bar $e$, connecting with the two bearings or hooks, $i\ i$ at $r\ r$, while the two bars $c\ c$ connect the ends $s\ s$ of said hooks $i\ i$ to the hooks $a\ a$; said hooks $a\ a$ being upon the extreme outer ends of the bars $c\ c$, and forming the two outer hooks, while the projections $i\ i$ form the two inner hooks, there being thus four separate and distinct bearing-surfaces or hooks, forming collectively a single belt-hook.

When it is desired to unite the two ends of a belt together, by means of my invention, the ends of the belt are properly cut off at any desired angle, and the holes $b\ h\ m\ n$ are made in the ends of the belt, as shown in figs. 5 and 6.

The belt-hook is there held with one of the hooks $a$, inserted in the hole $m$ or $h$ upon either side of the belt, the other end $a$ being back from the end of the belt beyond the hole $n$ or $b$. The end $a$, which is inserted in the hole $h$ or $m$, is then forced farther through the hole $h$ or $m$, and back towards the hole $n$ or $b$, while the other end of the hook is brought over toward the end of the belt, which movement causes the end $a$, which was inserted in the hole $h$ or $m$, to enter the hole $b$ or $n$ from the other side of the belt, and protrude through to the same side of the belt at which it entered the hole $h$ or $m$. The hook is now wholly inserted in the holes at one end of the belt. The two ends of the belt are now placed together, with either their right or wrong sides together, and the other end of the hook inserted in the other end of the belt in precisely the same manner.

It is evident that the hook-portions $a\ a\ i\ i$ may be made curved, instead of being at a right angle with the central bar $e$, without departing from the principle of its operation.

This makes a strong connection for a belt, which adapts itself to any position which the belt may attain, and passes over a pulley with equal facility as a common leather-lacing connection, and a belt may be easily and quickly disconnected and repaired in case of breakage or stretching, and a belt connected with this device and in this manner will last much longer than if connected with any other hook now in use.

The device is easily and cheaply made, and may be made of any desired length and size to suit the different widths and weights of belts.

Having thus described my invention, what I claim as new, and desire to secure by Letters Patent, is—

The four hooks $a\ i\ i\ a$, all connected longitudinally, by means of the central bar $e$ and the two end bars $c\ c$, the whole constituting a belt-hook, and constructed substantially as herein described, and for the purposes specified.

In testimony whereof, witness my hand, this fourth day of April, A. D. 1868.

EDWIN F. SHERMAN.

Witnesses:
 T. A. CURTIS,
 F. E. RICE.